(12) United States Patent
Takubo

(10) Patent No.: US 6,761,196 B2
(45) Date of Patent: Jul. 13, 2004

(54) PNEUMATIC TIRE HAVING LUG GROOVES (75) Inventor: Yoshihisa Takubo, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/769,339

(22) Filed: Jan. 26, 2001

(65) Prior Publication Data
US 2002/0100525 A1 Aug. 1, 2002

(30) Foreign Application Priority Data
Jan. 26, 2000 (JP) ........................................ 2000-017535

(51) Int. Cl.$^7$ .................. B60C 11/03; B60C 11/11; B60C 11/117; B60C 101/00; B60C 107/02
(52) U.S. Cl. ............................ 152/209.17; 152/209.12; 152/209.22
(58) Field of Search ....................... 152/209.12, 209.13, 152/209.17, 209.22

(56) References Cited

U.S. PATENT DOCUMENTS

| D99,597 | S | * | 5/1936 | Caldwell |
| D170,710 | S | * | 10/1953 | Nellen |
| 4,202,391 | A | * | 5/1980 | Shibayama et al. |
| 4,296,789 | A | * | 10/1981 | Roberts et al. |
| 4,700,762 | A | * | 10/1987 | Landers |
| 6,347,653 | B1 | * | 2/2002 | Kobayashi |

FOREIGN PATENT DOCUMENTS

| EP | 593288 | * | 4/1994 |
| EP | 0 773 117 A1 | * | 5/1997 |
| EP | 1 008 466 A2 | * | 6/2000 |
| GB | 691587 | * | 5/1953 |
| JP | 58-152606 | * | 9/1983 |
| JP | 03-295705 | * | 12/1991 |
| JP | 5-96913 | * | 4/1993 |
| JP | 5-155204 | * | 6/1993 |
| JP | 11-139113 | * | 5/1999 |

* cited by examiner

Primary Examiner—Steven D. Maki
(74) Attorney, Agent, or Firm—Sughrue Mion, PLLC (57) ABSTRACT An auxiliary groove is formed in tire circumferential direction on a tire central plane of an pneumatic tire according to the present invention. This auxiliary groove is formed, whereby a negative ratio of a center region other than the lug groove is set to 10% to 25%. Thus, a tread heat radiation quantity can be decreased, and a surface area of a tire can be increased. As a result, heat radiation properties can be improved. In addition, as long as the negative ratio is within the above set range, the wear of the tread can be reduced to the minimum. Namely, according to the present invention, there can be provided an pneumatic tire capable of both reducing the wear of the tread to the minimum and improving a heat radiation effect.

19 Claims, 6 Drawing Sheets

| | FIRST EMBODIMENT | | SECOND EMBODIMENT | | THIRD EMBODIMENT | |
|---|---|---|---|---|---|---|
| APPLIED RIM | 27.00/6.0 | | 41.00/5.0 | | 41.00/5.0 | |
| REGULAR INTERNAL PRESSURE | 700kPa | | 600kPa | | 600kPa | |
| REGULAR LOAD | 51.5 ton | | 94.5 ton | | 94.5 ton | |
| | BEFORE ADDING RECESS PORTION | AFTER ADDING RECESS PORTION | BEFORE ADDING RECESS PORTION | AFTER ADDING RECESS PORTION | BEFORE ADDING RECESS PORTION | AFTER ADDING RECESS PORTION |
| WEAR INDEX | 100 | 98 | 100 | 96 | 100 | 96 |
| AVERAGE TEMPERATURE BETWEEN 1/4 POINTS | 98°C | 94°C | 110°C | 104°C | 110°C | 103°C |
| NEGATIVE RATE OF LAND PORTION OTHER THAN MAIN GROOVE | / | 12.5% | / | 20% | / | 22% |
| DEPTH OF RECESS PORTION COMPARED WITH MAXIMUM DEPTH OF MAIN GROOVE | / | 15% | / | 40% | / | 40% |

PNEUMATIC TIRE HAVING LUG GROOVES

BACKGROUND OF THE INVENTION

1. Field of the Invention

The present invention relates to a pneumatic tire. In particularly, the present invention relates to a pneumatic tire having a lug pattern capable of improving a heat radiation effect of a tread used for a heavily loaded vehicle.

2. Description of the Related Art

Conventionally, a tread rubber with a good wear resistance has been used in order to ensure improvement of wear resistance of an pneumatic tire (hereinafter, referred to as a tire, for convenience). In addition, in a tread as well, there has been used a method in which a tread volume is increased, a tread gauge is thickened, and a negative ratio in tread is lowered.

In the meantime, recently, an increase of tire size, low aspect ratio trend of the tire, and heavy loading on the tire of a construction vehicle is accelerated due to the increase in size thereof in order to achieve a higher productivity. Moreover, a construction vehicle with a higher speed is also being widely developed. Under such a circumference, heat generation of a tread portion is increased due to a higher speed of the (heavy) vehicle, which may cause troubles such as heat separation of the tread portion.

That is, heat generation of the tire tread portion is caused by repetition of a tread compression stress experienced in a tire grounding region and a bending stress generated at a stepping-in portion and a kicking-outportion. In particular, in a heavily loaded tire for an off-the-road in which the tread gauge thickness is relatively thick, the tread volume at the tire center portion is increased, and thus heat buildup therein is also increased. As a result, the temperature at the center portion increases during vehicle running, which may cause a heat separation trouble.

SUMMARY OF THE INVENTION

The present invention has been made in consideration of the above facts. It is an object of the present invention-to provide an pneumatic tire capable of reducing the wear of a tread to the minimum, and improving a heat radiation effect.

According to a first aspect of the present invention, there is provided an pneumatic tire comprising: a tread; a lug groove extending from a shoulder side of said tread toward a tire central (equatorial) plane, the lug groove being provided in plurality at said tread in the tire peripheral direction to form a lug pattern; and a recess portion being provided in a center region of the tread, the center region extending in the tire peripheral direction with a width that in 50% of a maximum width (w) of tire ground contacting portion so as to be symmetrical with respect to the tire central plane of said tread, wherein a negative ratio of the center region other than said lug groove is set to 10% to 25% and an axially inner groove edge of each lug groove is aligned on the central plane.

According to this aspect, the negative ratio of the center region is set within the above range, whereby the improvement of heat generation properties (more precisely, generated-heat-radiation properties, which will be referred to as "heat radiation properties" hereinafter) and the reduction of wear can be made compatible with each other.

According to a second aspect of the present invention, the depth of a recess portion of the above pneumatic tire is 10% to 45% of the maximum depth of the lug groove.

According to this aspect, the depth of the recess portion is set to 10% to 45% of the maximum depth of the lug groove. Thus, heat radiation properties of the tread is improved, and the wear of the tread can be reduced.

According to a third aspect of the present invention, a recess portion of the pneumatic is an auxiliary groove sequentially formed in the circumferential direction of the tire.

According to this aspect, the recess portion is provided as an auxiliary groove sequentially formed in the circumferential direction of the tire, whereby an air flow can be improved during tire rolling. Thus, heat radiation properties of the tire can be improved.

According to a fourth aspect of the present invention, the depth of a lug groove of the above pneumatic tire is made gradually shallower from the shoulder side toward the tire central plane.

According to this aspect, the depth of the lug groove is made gradually shallower from the shoulder side toward the tire central plane, whereby the distribution of the tread rigidity can be uniformed, and the wear of the tread can be decreased.

According to a fifth aspect of the present invention, in the above pneumatic tire, the maximum depth of a lug groove in the center region that corresponds to 50% of the maximum width of tire ground contacting portion is 60 mm or more.

According to this aspect, in particular, in a relatively large tire of 24.00R49 or more in size, the maximum depth of the lug groove in the center region that corresponds to 50% of the maximum width of tire ground contacting portion sets 60 mm or more, and heat radiation properties of the tire can be effectively improved in spite of the increase in the tread volume and the heat generation.

DETAILED DESCRIPTION OF THE PREFERRED EMBODIMENTS

First, the first aspect of the present invention and an action of an pneumatic tire according to this aspect will be described. Further, the second and fourth aspects will be described, and the embodiments of the present invention constructed according to such aspects will be described.

According to the first aspect of the present invention, as described above, an pneumatic tire comprising: a tread; a lug groove extending from a shoulder side of said tread toward a tire central plane, the lug groove being provided in plurality at said tread in the tire peripheral direction to form a lug pattern; and a recess portion being provided in a center region of the tread, the center region extending in the tire peripheral direction with a width that in 50% of a maximum width (W) of tire ground contacting portion so as to be symmetrical with respect to the tire central plane of said tread, wherein a negative ratio of the center region other than said lug groove is set to 10% to 25%.

An action of a thus constructed pneumatic tire will be described below.

The basic performance required for a pneumatic tire, in particular, a heavily loaded pneumatic tire adapted for off-the-road running, is evaluated by the tire life in which the tire is safely used before the tire becomes too worn to be used. During vehicle running, a tire tread portion generates heat. This heat generation or radiation is particularly problematic soon after the start of using a new tire in which the tread gauge is relatively thick. Further, in general, a new tire is often mounted as a front tire. The front tire receives a relatively large side force input, and is thermally affected in particular.

In the present invention, a recess portion is provided in a center region that corresponds to 50% of the maximum width of tire ground contacting region, and the negative ratio of the center region other than the lug groove is set to 10% to 25%. Thus, the amount of heat generated in the tire tread can be reduced, a surface area of the tire can be increased, and the heat radiation properties of the tire can be improved.

A recess portion provided in the tire center region decreases the tire tread volume and could facilitate wear in some cases. However, in the present invention, due to the negative ratio being set within the above unique range, the wear can be reduced to the minimum.

When the negative ratio is less than 10% heat radiation properties are lowered. When the rate is more than 25%, a tread is likely to be worn quickly. That is, by setting the negative ratio of the center region in the above particular range, the improvement of heat radiation properties and reduction of wear can be made compatible with each other.

In the present invention, a pneumatic tire, when it is used, is mounted to a rim prescribed in the regulations issued by JATMA (Japan), TRA (U.S.A), and ETRTO (Europe) or the like according to their size, and such a rim is generally called a regular rim.

Similarly, the "regular load" and "regular internal pressure" each indicate a maximum load and an internal air pressure observed under the maximum load in the application size ply rating defined in the regulations.

In addition, in the present specification, "the maximum width of tire ground contacting portion" indicates the maximum width of the grounding region in the tire axial direction of a tread when a tire is rimmed in a regular rim and inflated at the regular internal pressure, and a regular load is loaded on the tire statically.

Here, a load represents the maximum load (maximum load capacity) of a single wheel in the application size described in the following standards. An internal pressure represents an air pressure that corresponds to the maximum load (maximum load capacity) of a single wheel in the application size. A rim represents a standard rim (or "approved rim" or "recommended rim") in the application size described in the following standards.

In addition, the standards used here are determined in accordance with the industrial standards valid to an area where tires are produced or used. Such standards include "YEAR BOOK (including the DESIGN GUIDE) of The Tire and Rim Association Inc." in the U.S.A; "Standards Manual of The European Tire and Rim Technical organization" in Europe; and "JATMA Year Book" issued by Japan Automobile Tire Association in Japan.

In the pneumatic tire according to the second aspect of the present invention, as described above, the depth of the recess portion is set to 10% to 45% of the maximum depth of a lug groove.

With this construction, the depth of a recess portion is set to 10% to 45% of the maximum depth of a lug groove. Thus, heat radiation properties of the tread is improved, and the wear of the tread can be reduced.

If the depth of the recess portion is less than 10% of the maximum depth of the lug groove, the recess portion becomes too shallow. In other words, the surface area of the tire cannot be as large as desired, and heat radiation properties are lowered. On the other hand, when the depth of the recess portion is larger than 45% of the maximum depth of the lug groove, the rigidity of the tread is lowered, and is likely to be worn quickly Namely, the depth of the recess portion is set within the above range, whereby the improvement of heat radiation properties and the reduction of wear can be made compatible with each other.

In an pneumatic tire according to the fourth aspect of the present invention, as described above, the depth of the lug groove is gradually shallower from the shoulder side toward the tire central plane (line).

A conventional tire has a structure in which the depth of the lug groove becomes suddenly deeper at a ⅛ point toward the shoulder side. Thus, the distribution of the tread rigidity rapidly changes at a certain point, which adversely affects the tire wear resistance.

However, in the case of the present invention, the depth of the lug groove is made gradually shallower from the shoulder side to the tire central plane, whereby the distribution of the tread rigidity can be uniformed, and the wear of the tread can be decreased.

The term "gradually" in the present specification indicates that a region normal to a tire central plane CL(i.e., platform) is absent between a ¼ point and the tread central plane, and a gradient is about 80 degrees with respect to the central plane CL(that is, 10 degrees with respect to the tire axial direction) in a region that is ⅕ or more of a tread single width. In addition, the term "rapidly" in the present specification indicates a state in which the maximum depth of the lug groove is set to 0 in the above setting region. In the case of a conventional tire in which the depth of the lug groove changes rapidly, in general, the platform having the width (in the tire axial direction) of about 10% of a tread single width is provided near the tire central plane.

First Embodiment

Hereinafter, an pneumatic tire according to a first embodiment of the present invention will be described with reference to the accompanying drawings, FIG. 1A and FIG. 1B.

Figure 1A:
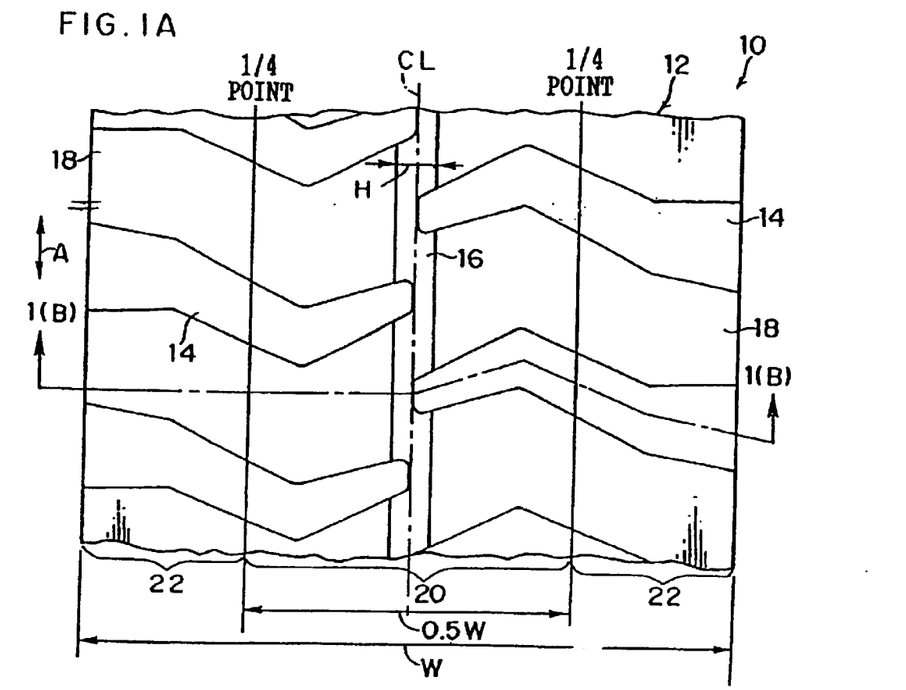
FIG. 1A is a plan view showing a tread of an pneumatic tire according to a first embodiment of the present invention.
Figure 1B:
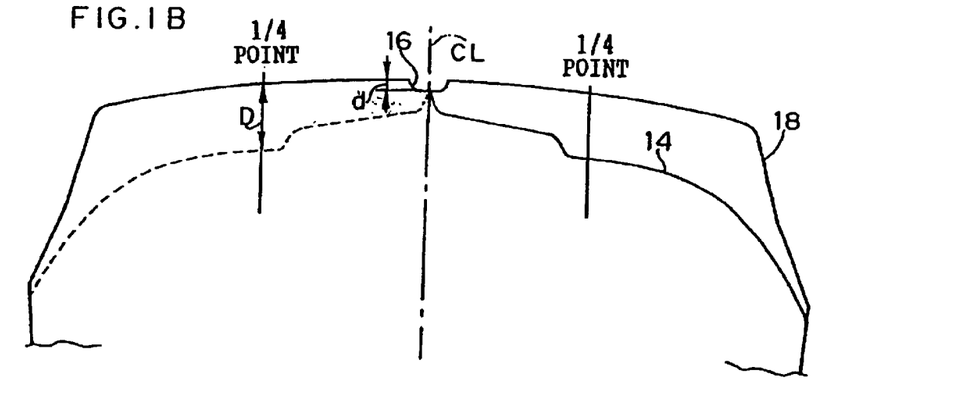
FIG. 1B is a sectional view taken along line 1B—1B, of the tread shown in FIG. 1A.

As shown in FIG. 1A and FIG. 1B, at a tread 12 of an pneumatic tire 10 (hereinafter, referred to as tire 10) according to the present embodiment, lug grooves 14 (main grooves) that extend from a shoulder portion to a tire central plane CL are formed in plurality in the tire circumferential direction (indicated by the arrow A) at certain spacing in addition, on the tire central plane CL, a continuous auxiliary groove 16 (recess portion) is continuously provided in the tire circumferential direction so that the tire central plane CL-side end of the lug groove 14 is each connected thereto. Further, a land portion 18 is provided between the adjacent lug grooves 14.

In other words, in the tread 12, when a region corresponding to within 50% (440 mm in the present embodiment) of the maximum width w (880 mm in the present embodiment) and extending symmetrical with respect to the central plane CL is defined as a center region 20, and the regions located on the tire-axial direction outer sides of the center region 20 are defined as side regions 22, the lug groove 14 is formed so that its depth becomes gradually shallower from the side region over the center region 20. In particular, the maximum depth in the center region 20 is set to 60 mm or more (the depth D is 85 mm at a ¼ point (at a distance of w/4 from the center central plane CL) in the present embodiment) In addition, the negative ratio in the center region 20 (a negative groove 14 corresponds to negative portion) is set within the range of 15% to 25%.

On the other hand, an auxiliary groove 16 is formed in the center region 20. By forming this auxiliary groove 16, the negative ratio in the center region 20 other than the lug groove 14 (here the auxiliary groove 16 corresponds to the negative portion) is set to 10% to 25%. In addition, the depth "d" of the auxiliary groove 16 is set to 10% to 45% of the maximum depth of the lug groove 14. In the present embodiment, the depth "d" is set to 12 mm, and the width H of the auxiliary groove 16 is set to 50 mm.

This auxiliary groove 16 is not limited to one, and may be provided in any number as long as the above setting is met.

In addition, with respect to the physical properties of a tread rubber used in a tread 12, it is preferable that tan δ at the room temperature (25° C.) is set to 0.05 to 0.4, and the Young modulus (E') is set to $3 \times 10^6$ to $20 \times 10^6$ (Pa).

Next, an action and effect of the pneumatic tire 10 will be described with reference to FIG. 4A, FIG. 4B, FIG. 5A and FIG. 5B.

Firstly, FIG. 4A, FIG. 4B, FIG. 5A and FIG. 5B will be described.

Figures 4A, 4B:
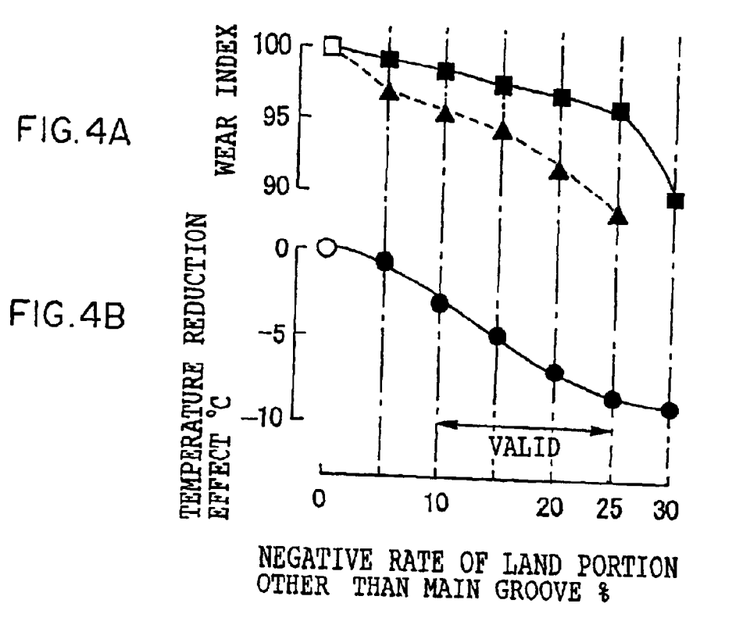
FIG. 4A is a graph depicting a relationship between a wear index (longitudinal axis) and a negative ratio (horizontal axis) in a center region other than a lug groove.
FIG. 4B is a graph depicting a relationship between a temperature reduction effect (longitudinal axis) and a negative ratio (horizontal axis) in a center region other than a lug groove.

FIG. 4A is a graph depicting a relationship between a wear index (longitudinal axis) and a negative ratio (horizontal axis) of the center region 20 other than the lug groove 14. FIG. 4B is a graph depicting a relationship between a temperature reduction effect (longitudinal axis) and a negative ratio (horizontal axis) of the center region 20 other than the lug groove 14.

Figures 5A, 5B:
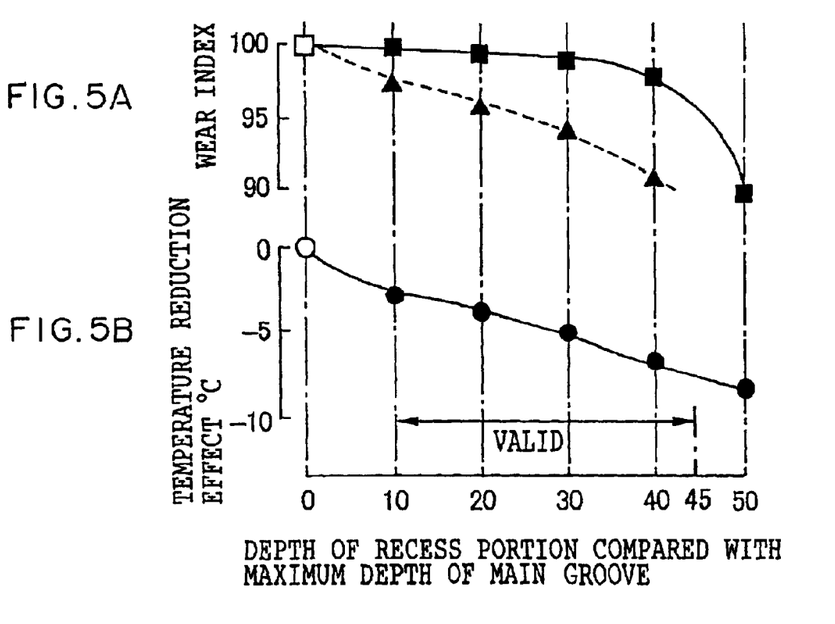
FIG. 5A is a graph depicting a relationship between a wear index (longitudinal axis) and a rate (horizontal axis) of a depth of an auxiliary groove with respect to the maximum depth of a lug groove.
FIG. 5B is a graph depicting a relationship between a temperature reduction effect (longitudinal axis) and a rate (horizontal axis) of a depth of an auxiliary groove with respect to the maximum depth of the lug groove.

FIG. 5A is a graph depicting a relationship between a wear index (longitudinal axis) and a rate (horizontal axis) of the depth of an auxiliary groove 16 with respect to the maximum depth of the lug groove 14. FIG. 5B is a graph depicting a relationship between a temperature reduction effect (longitudinal axis) and a rate (horizontal axis) of the depth of the auxiliary groove 16 with respect to the maximum depth of the lug groove 14.

FIG. 4A and FIG. 4B show values obtained under a condition in which the depth of the auxiliary groove 16 with respect to the maximum depth of the lug groove 14 is set to 15% (constant). FIG. 5A and FIG. 5B show values obtained under a condition in which the negative ratio of the center region 20 other than the lug groove 14 is 12.5% (constant).

In addition, the solid lines in FIG. 4A and FIG. 5A denote curves obtained when a lug groove 14 formed to be gradually shallower from a ¼ point toward the tire central plane CL is tested; and the dotted lines in these figures denote curves obtained when a lug groove 14 formed to be rapidly deeper from a ⅛ point (a point of W/8 distance from the tire central plane CL) is tested.

Further, the term "wear index" in the figures represents a value that indicates a time for a belt disposed inside of the tire 10 to be exposed in the center region 20 (between the ¼ points) (hereinafter, this belt-exposing phenomenon will be referred to as "belt exposure"), and the term "temperature" represents an average temperature in the center region 20 (between ¼ points).

When a tire 10 is rolled, the tread 12 is repeatedly bent and deformed, and the tread 12 is heated. In the tire 10 according to the present embodiment, an auxiliary groove 16 is formed in the center region 20 of the tread 12. Therefore, the tread volume in the vicinity of the center region 20, i.e., tire central plane CL is reduced, and the compression stress of the center region 20 is alleviated. As a result, the amount of heat radiation in the vicinity of the tire central plane CL decreases, and the surface area of the tire 10 increases. Thus, a heat radiation effect is improved, and a temperature increase in the vicinity of the tire central plane CL during roll of the tire can be reduced.

Further, as shown in FIG. 4A and FIG. 4B, by forming the auxiliary groove 16, a negative ratio in the center region 20 other than the lug groove 14 is set to 10% to 25%. In other words, a decrease in tread volume can be reduced to the minimum with this structure, thereby suppressing the wear of the tread 12 to the minimum. As a result, the temperature reduction effect of the tread 12 and the reduction of wear can be made compatible with each other.

Furthermore, as shown in FIG. 5A and FIG. 5B, the depth of the auxiliary groove 16 is set to 10% to 45% of the maximum depth of the lug groove 14, whereby the deterioration of rigidity of the tread 12 can be suppressed to the minimum. In other words, with such a structure, the temperature reduction effect of the tread 12 and the reduction of wear can be made compatible with each other.

The depth of the lug groove 14 is formed to become gradually shallower from the shoulder side toward the tire central plane CL. Thus, the distribution in rigidity of the tread 12 becomes homogeneous, which is desirable in terms of effecting an excellent wear resistance of the tire 10.

Second Embodiment

An pneumatic tire 30 according to a second embodiment of the present invention will be described hereinafter.

In the present embodiment, like elements of the pneumatic tire 10 according to the first embodiment are omitted conveniently, and like elements is designated by like reference numerals.

Figure 2A:
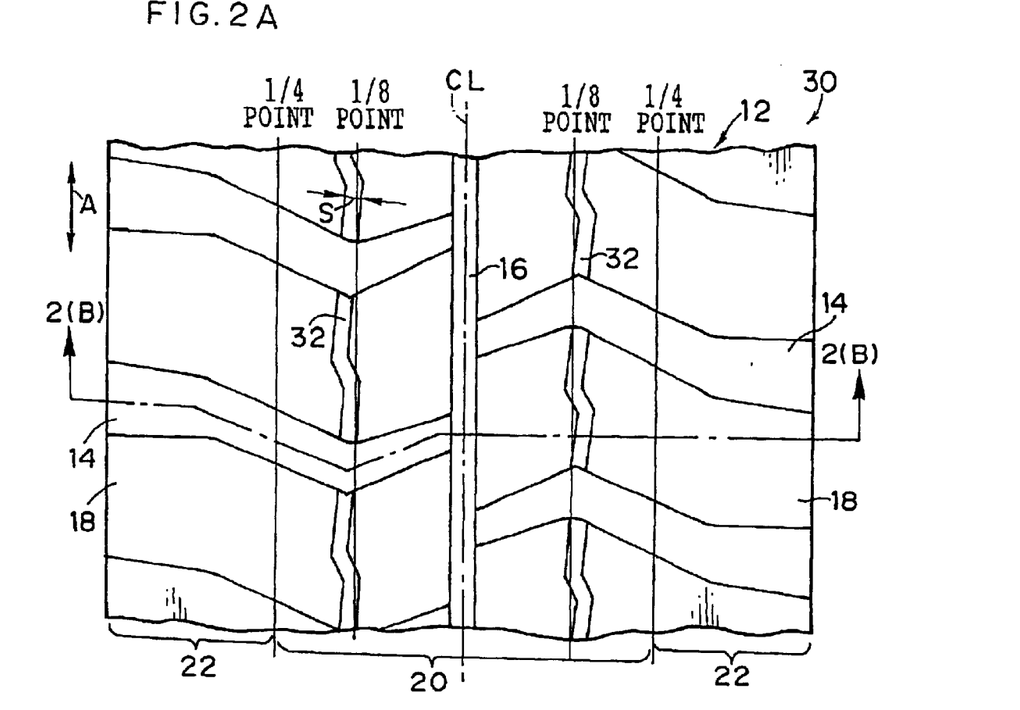
FIG. 2A is a plan view showing a tread of an pneumatic tire according to a second embodiment of the present invention.
Figure 2B:
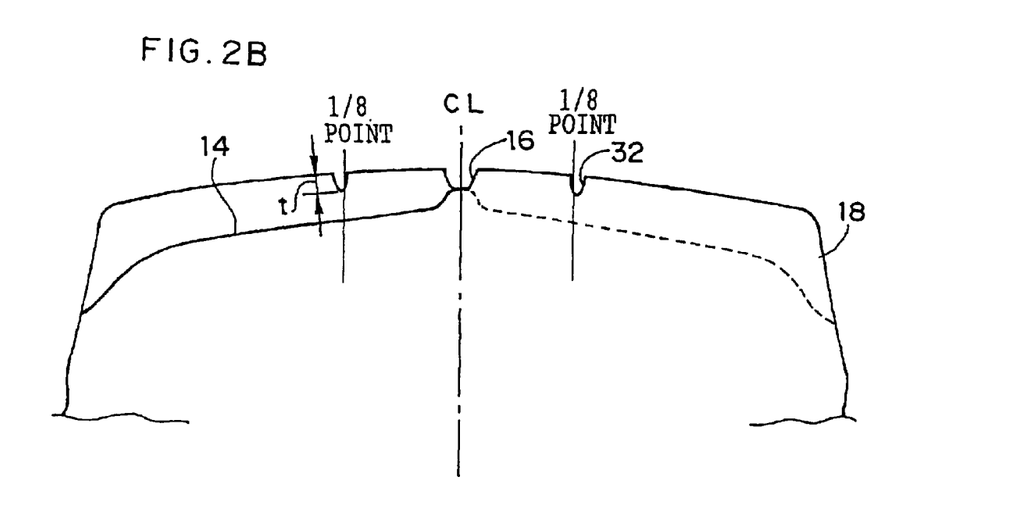
FIG. 2B is a sectional view taken along line 2B—2B, of the tread shown in FIG. 2A.

As shown in FIG. 2A and FIG. 2B, in the pneumatic tire 30 according to the present embodiment, a plurality of auxiliary grooves 32 that extend in the tire circumferential direction (as indicated by the arrow A) are formed at the positions of substantially ⅛ point of a land portion 18 (refer to the drawings) so that each auxiliary groove 32 is located between the adjacent lug grooves 14. The auxiliary groove 32 is formed in substantially rectangular shape, and the circumferential direction end portions thereof communicate with the lug groove 14.

In the present embodiment, the width H of the auxiliary groove 16 formed on the tire central plane CL is set to 50 mm, and the depth "d" is set to 35 mm. In addition, the width S of the auxiliary groove 32 formed at the ⅛ point is set to 25 mm, and the depth "t" set to 35 mm.

In addition, in the pneumatic tire 30 according to the present embodiment, the maximum width W of the tire ground contacting portion is set to 1200 mm (600 mm at one side); a distance between the tire central plane CL and the ¼ point is set to 300 mm; and the depth D of the lug groove 14 at the ¼ point is set to 89 mm.

In the pneumatic tire 30 according to the present embodiment, an effect similar to that achieved by the pneumatic tire 10 according to the first embodiment is obtained, and the improvement of a heat radiation effect and the reduction of wear can be made compatible with each other.

Third Embodiment

An pneumatic tire 40 according to a third embodiment of the present invention will be described hereinafter.

In the present embodiment, like elements of the pneumatic tire 10 according to the first embodiment are omitted conveniently, and like elements are designated by like reference numerals.

Figure 3A:
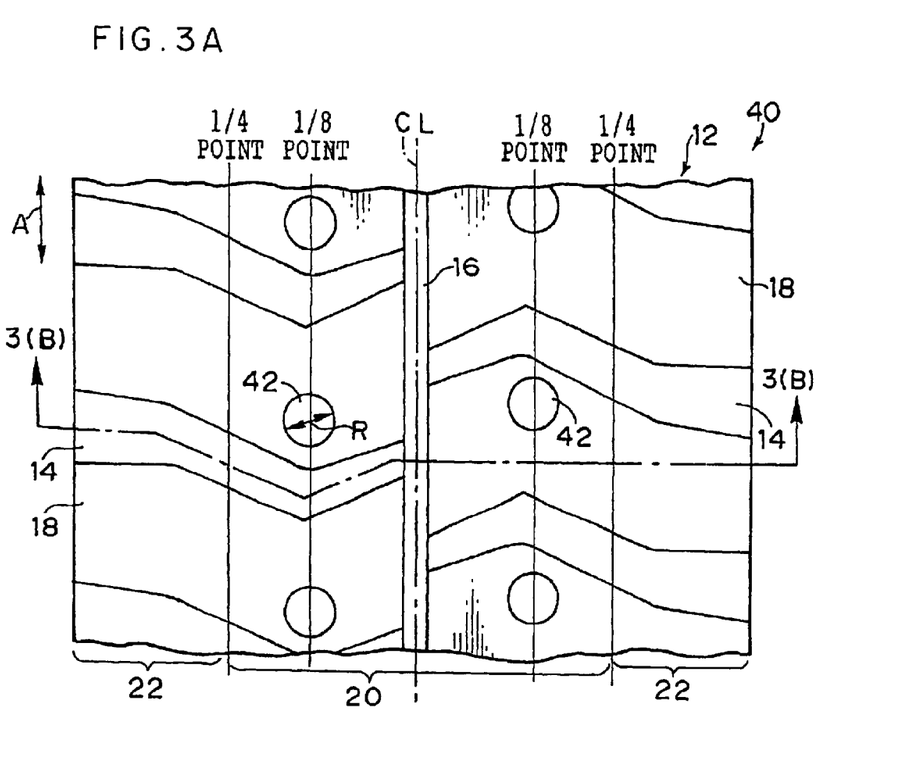
FIG. 3A is a plan view showing a tread of an pneumatic tire according to a third embodiment of the present invention.
Figure 3B:
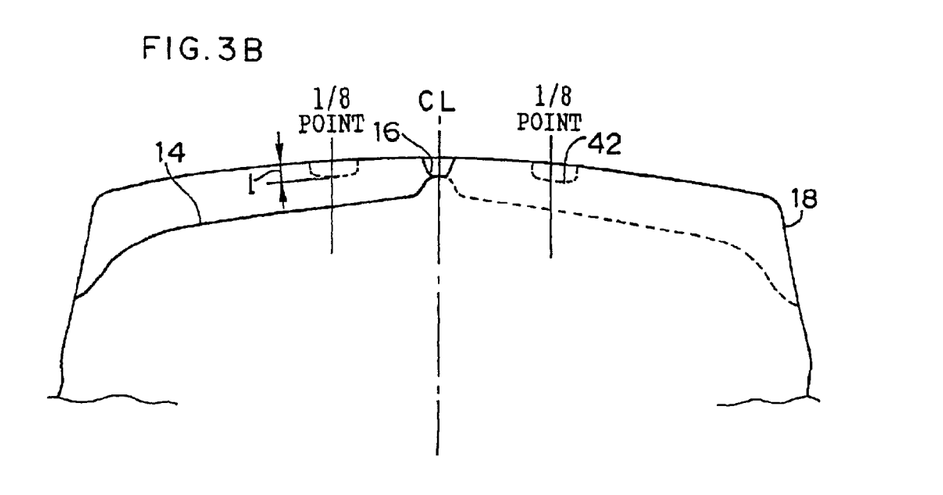
FIG. 3B is a sectional view taken along line 3B—3B, of the tread shown in FIG. 3A.

As shown in FIG. 3A and FIG. 3B, in the pneumatic tire 40 according to the present embodiment, a plurality of circular auxiliary grooves 42 are formed at the positions of substantially ⅛ point of the land portion 18 so that each circular auxiliary groove 42 is located between the adjacent lug grooves 14.

In the present embodiment, the width H of the auxiliary groove 16 formed on the tire central plane CL is set to 50 mm, and the depth "d" thereof is set to 35 mm. In addition, the diameter R of the auxiliary groove 42 is set to 70 mm, and the depth "1" thereof is set to 20 mm.

In addition in the pneumatic tire 40 according to the present invention, the maximum width W of the tire ground contacting portion is set to 1200 mm (600 mm at one side); a distance between the tire central plane CL and the ¼ point is set to 300 mm, and the depth D of the lug groove 14 at the ¼ point is set to 89 mm.

In the pneumatic tire 40 according to the present embodiment, an effect similar to that achieved by the pneumatic tire 10 according to the first embodiment is obtained, and the improvement of a heat radiation effect and the reduction of wear can be made compatible with each other.

A definite self closing type groove such as an ellipsoidal one may be formed as a shape other than circular auxiliary groove 42.

Test Example

Now, the test results of the pneumatic tires 10, 30, and 40 according to the embodiments will be described here.

The pneumatic tires 10, 30, and 40 according to the aforementioned embodiments were mounted on a regular rim based on TRA, and the wear performance evaluation and the heat radiation performance evaluation were each carried out. The test results are shown in a table of FIG. 6. Here, the term "wear index" in the table expresses exponentially a running time required for the belt exposure between the ¼ points at the testing site. Here, it is indicated that the smaller value is, the more easily wear occurs. In addition, the term "temperature" is defined as an average temperature between the ¼ points observed after a drum running for 24 hours at the regular internal pressure and under the regular load.

Figure 6:
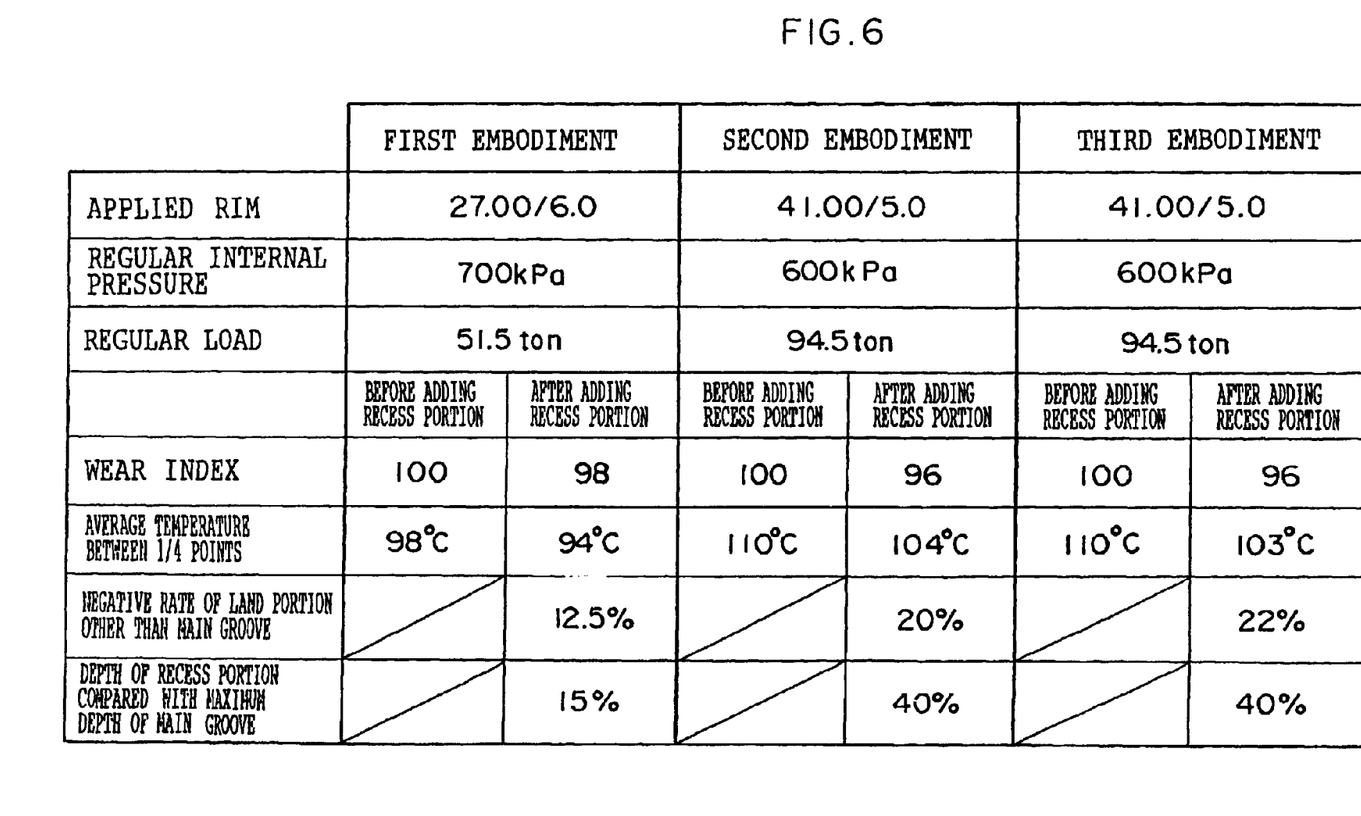
FIG. 6 is a table showing the test result in the pneumatic tire according to each of the embodiments of the present invention.

Referring to this table, with respect to the pneumatic tire 10 (tire size ORR 37. 00 R57) according to the first embodiment, the average temperature was lowered by 4° C. as compared with a conventional pneumatic tire in which the auxiliary groove 16 is not formed. On the other hand, deterioration of the wear index was suppressed to only 2 points dropping.

With respect to the pneumatic tire 30 (tire size ORR 55/80 R63) according to the second embodiment, the average temperature was lowered by 6° C. as compared with a conventional pneumatic tire. On the other hand, deterioration of the wear index was suppressed to only 4 points dropping.

With respect to the pneumatic tire 40 (tire size ORR 55/80 R63) according to the above third embodiment, the average temperature was lowered by 7° C. as compared with a conventional pneumatic tire. On the other hand, deterioration of the wear index was suppressed to only 4 points dropping.

From the above test results, in any of the pneumatic tires 10, 30, and 40 according to the first to third embodiments of the present invention, the temperature can be lowered by 3° C. or more without dropping the wear index by 5 points or more as comparison with a conventional pneumatic tire. In other words, it was found that lowering of temperature and reduction of wear can be made compatible with each other.

In short, according to the pneumatic tire of the present invention, the tread wear can be reduced to the minimum, and a heat radiation effect can be improved.

What is claimed is:

1. A pneumatic tire comprising:
    a tread;
    a lug groove extending from a shoulder side of said tread toward a tire central plane; the lug groove being provided in plurality at said tread in the tire circumferential direction to form a lug pattern, such that an axially inner groove edge of each lug groove is aligned on the central plane; and
    excess portion being provided in a center region of the tread, the center region extending in the tire circumferential direction with a width that is 50% of a maximum width of tire ground contacting portion so as to be symmetrical with respect to the tire central plane of said tread;
    wherein a negative ratio of the center region other than said lug groove is set to 10% to 25%; and
    wherein a maximum depth of said lug groove in said center region of said tread is 60 mm or more.

2. A pneumatic tire according to claim 1, wherein a depth of said recess portion is 10% to 45% of the maximum depth of said lug groove.

3. A pneumatic tire according to claim 1, wherein said recess portion is at least one auxiliary groove sequentially formed in the tire circumferential direction.

4. A pneumatic tire according to claim 3, wherein said auxiliary groove is at least one groove portion that is sequentially formed in the tire circumferential direction so as to connect the adjacent lug grooves.

5. A pneumatic tire according to claim 1, wherein a depth of said lug groove is, made gradually shallower from the shoulder side toward the tire central plane.

6. A pneumatic tire according to claim 5, wherein a bottom portion of said lug groove, in a cross section thereof in the tire radial direction, is free of a portion normal to, the central plane of the tire, in a region between said tire central plane and a point which is distant by W/4 from the central plane.

7. A pneumatic tire according to claim 5, wherein a cross section in the tire radial direction of said lug groove bottom portion is inclined by substantially 80 degrees with respect to the tire central plane in a region having the width of ⅕ or more of a tread half width.

8. A pneumatic tire according to claim 5, wherein said auxiliary groove is at least one closed type groove portion that is sequentially formed in the tire circumferential direction at a land portion positioned between the adjacent lug grooves.

9. A pneumatic tire according to claim 8, wherein said auxiliary groove is at least one substantially circular groove portion that is sequentially formed in the tire circumferential direction at a land portion positioned between the adjacent lug grooves.

10. A pneumatic tire according to claim 1, wherein a maximum depth of said lug groove at a point which is distant by W/4 from the tire central plane is set to 60 mm or more.

11. A pneumatic tire according to claim 1, wherein an axially inner end portion of each groove has a deeper depth than the recess portion.

12. A pneumatic tire comprising:

a tread;

a lug groove extending from a shoulder side of said tread toward a tire central plane, the lug groove being provided in plurality at said tread in the tire circumferential direction to form a lug pattern, such that an axially inner groove edge of each lug groove is aligned on the central plane; and a recess portion being provided in a center region of the tread, the center region extending in the tire circumferential direction with a width that is 50% of a maximum width (W) of tire ground contacting portion so as to be symmetrical with respect to the tire central plane of said tread;

wherein a depth of said recess portion is set to 10% to 45% of a maximum depth of said lug groove; and wherein a maximum depth of said lug groove in said center region of said tread is 60 mm or more.

13. A pneumatic tire according to claim 12, wherein said recess portion is at least one auxiliary groove sequentially formed in the tire circumferential direction.

14. A pneumatic tire according to claim 12, wherein a depth of said lug groove is made gradually shallower from the shoulder side toward the tire central plane.

15. A pneumatic tire according to claim 12, an axially inner end portion of each lug groove has a deeper depth than the recess portion.

16. A pneumatic tire comprising:

a tread;

a lug groove extending from a shoulder side of said tread toward a tire central plane, the lug groove being provided in plurality at said tread in the tire circumferential direction to form a lug pattern, such that an axially inner groove edge of each lug groove is aligned on the central plane; and a recess portion continuously provided in the tire circumferential direction on the tire central plane of said tread; and another recess portion sequentially formed in the tire circumferential direction in a center region that extends in the tire circumferential direction with a width that is 50% of a maximum width (W) of tire ground contacting portion so as to be symmetrical with respect to the tire central plane of said tread;

wherein a negative ratio of the center region other than said lug groove is set to 10% to 25%; and wherein a maximum depth of said lug groove in said center region of said tread is 60 mm or more.

17. A pneumatic tire according to claim 16, wherein a depth of said recess portion is 10% to 45% of the maximum depth of said lug groove.

18. A pneumatic tire according to claim 16, wherein a depth of said lug groove is made gradually shallower from the shoulder side toward the tire central plane.

19. A pneumatic tire according to claim 16, an axially inner end portion of each lug groove has a deeper depth than the recess portion.

* * * * *